United States Patent [19]

Scott

[11] 3,833,768

[45] Sept. 3, 1974

[54] PBX AUTOMATIC OPERATOR RECALL ACCESSORY

[76] Inventor: Gene E. Scott, 5445 S.W. Watson, Beaverton, Oreg. 97005

[22] Filed: Dec. 1, 1972

[21] Appl. No.: 311,366

[52] U.S. Cl. .................................................. 179/42
[51] Int. Cl. ............................................ H04m 5/04
[58] Field of Search ................................ 179/42, 99

[56] References Cited

UNITED STATES PATENTS

| | | | |
|---|---|---|---|
| 2,278,702 | 4/1942 | Knittle | 179/42 |
| 2,812,386 | 11/1957 | Carter | 179/99 |

*Primary Examiner*—William C. Cooper
*Attorney, Agent, or Firm*—Daniel P. Chernoff; Jacob E. Vilhauer, Jr.

[57] ABSTRACT

An automatic operator recall accessory adaptable for attaching to the trunk circuitry of private branch telephone exchange switchboards. The accessory comprises a time-delay switching circuit on a printed circuit board adaptable to be interposed between the operator's console light and buzzer and the standard PBX switchboard circuit which normally selects and transmits signals to the light and buzzer. When the operator extends a trunk call by connecting it to an idle extension, placing the call on hold, or "camping on" the call to a busy extension, the recall circuit begins a time delay period during which the operator's light and buzzer are permitted to receive signals from the standard switching signal transmission circuit. If, however, after a predetermined period of time dependent upon the adjustment of the accessory's time delay circuit the caller has been unable to complete his call, the recall circuit automatically disconnects the operator's light and buzzer from the standard signal transmission circuit and simultaneously connects the light and buzzer to the switchboard's "unanswered call" signal generator, thereby alerting the operator to switch onto the trunk line and attend to the caller. One such recall accessory is required for each separate trunk line of the switchboard unit.

10 Claims, 1 Drawing Figure

SYSTEM FOR OBTAINING THE SPEECH EXTRACTION COEFFICIENTS

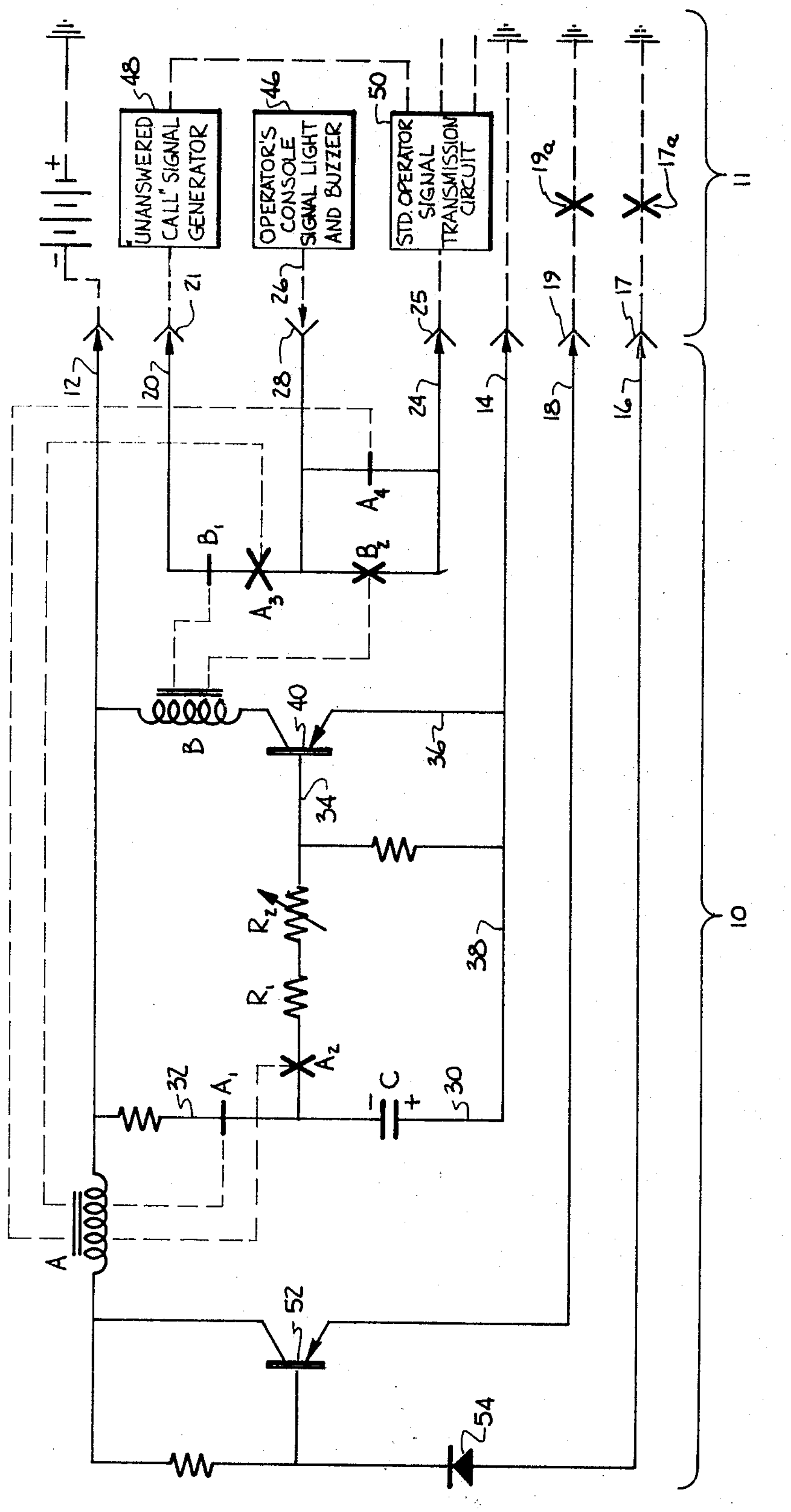
"UNANSWERED CALL" SIGNAL GENERATOR
OPERATOR'S CONSOLE SIGNAL LIGHT AND BUZZER
STD. OPERATOR SIGNAL TRANSMISSION CIRCUIT
48
46
50
19a
17a
11
10
21
26
25
19
17
12
20
28
24
14
18
16
B1
B2
A3
A4
B
40
36
34
R2
R1
38
A1
A2
C
32
30
A
52
54

PBX AUTOMATIC OPERATOR RECALL ACCESSORY

BACKGROUND OF THE INVENTION

This invention relates to an automatic operator recall accessory for private branch telephone exchanges. More particularly the accessory functions to recall the operator automatically if a caller has been unable to complete his call during a predetermined period of time after the operator has extended the call to an idle extension, placed the call on hold, or "camped on" the call to a busy extension.

The great majority of PBX switchboard units in use today have a common functional characteristic which, unfortunately, causes substantial aggravation and loss of time for persons placing calls through the switchboard. The problem might occur in any of three situations. A caller dialing into one of the switchboard's trunk lines may have his call extended by the operator to the desired extension which, however, remains unanswered. Alternatively the desired extension may be busy, in which case the operator may place the call on hold and forget that she has done so. In a third situation, if the switchboard is so equipped, the operator may camp on the call to a busy extension by connecting the call to a special circuit designed to automatically ring the desired extension when it is no longer busy. In the latter case the extension may remain busy for an inordinate length of time or, if it is finally rung, it may not be answered. In all of the above situations, most switchboards will not automatically recall the operator after a certain period of time has elapsed without the call having been completed. Consequently, in many cases the busy operator forgets about the call altogether once she has initially dealt with it, and the frustrated caller is eventually forced to hang up and re-dial to obtain the operator's assistance.

Some modern PBX units have been designed with integral circuitry for automatically recalling the operator after a resonable time has elapsed in the above-described situations. However such switchboard units are not widely used and such integral circuitry is not adaptable for modifying existing switchboards which lack the recall function.

SUMMARY OF THE PRESENT INVENTION

The present invention is directed to an inexpensive printed circuit accessory adaptable for modifying and improving existing switchboard units by providing the automatic operator recall function described above. The recall accessory comprises a time-delay switching circuit having a plurality of leads adaptable for interposing the circuit between the operator's signal receiving equipment (usually a light and buzzer) and the switchboard's standard operator signal transmission circuit so as to alter, under appropriate circumstances, the signals which the operator would otherwise receive. The recall circuit is also adaptable for connecting to the switchboard's connecting circuit so as to automatically start a predetermined time delay period whenever the operator extends a call by connecting it to an idle extension, placing it on hold or camping on the call to a busy extension. If the call has not been completed at the expiration of the time delay period, the recall circuit automatically disconnects the operator's signal receiving equipment from the standard switchboard signal transmission circuit and connects the receiving equipment to the switchboard's "unanswered call" signal generator, whereby the operator is automatically recalled without the caller having to hang up and re-dial. The time delay period is adjustable in the range from approximately 10 to 60 seconds in order to meet the varying requirements of different switchboard applications. Each recall device requires only about 15 minutes to install adjacent the respective jack locations of the individual trunk circuits of the switchboard, one recall device being required per trunk circuit.

Accordingly, it is a primary objective of the present invention to provide a simple accessory adaptable for installation on existing telephone PBX switchboard units for adding an automatic operator recall function to the unit. It is a further objective of the invention that such accessory be easily and quickly installable without the need for modification of the integral trunk circuitry of the switchboard. The foregoing and other objectives, features and advantages of the present invention will be more readily understood upon consideration of the following detailed description of the invention taken in conjunction with the accompanying drawing.

BRIEF DESCRIPTION OF THE DRAWING

The single FIGURE is a schematic electrical circuit diagram of the automatic recall accessory, with the associated components of the switchboard unit shown in phantom.

DESCRIPTION OF THE PREFERRED EMBODIMENT

The automatic operator recall accessory of the present invention comprises a plug-in printed circuit card containing the electrical circuit designated generally as 10. The particular recall unit illustrated has leads adaptable specifically for installation on one-way or two-way A.E. Leich 40 and 80 PABX units, manufactured by Automatic Electric Company, of Genoa, Ill. However the basic time-delay switching circuitry employed may be used with any PBX switchboard unit. One circuit card is required per telephone trunk line, with no trunk modification being necessary.

The recall circuit 10 has seven connector leads enabling it to be attached to the trunk circuitry 11 of the switchboard. Leads 12 and 14 are for attaching to the trunk circuit's source of DC current to provide a power supply. Lead 16 attaches to the appropriate jack position 17 of the trunk circuit which selectively grounds the lead 16 only when the operator closes a key switch **17*a* to come on the particular trunk line. Lead 18 connects to the jack position 19 which selectively grounds lead 18 by closure of a connecting relay 19a only when the operator extends a trunk call (i.e. when she extends the call to an idle telephone extension, places the call on hold, or camps on the call to a busy extension). Lead 20 attaches to the appropriate jack position 21** of the trunk circuit which generates the operator's call signal for indicating an unanswered call on the trunk line.

Lead 24 connects to the jack position 25 which normally transmits the selective, variable signal for actuating the signal light and buzzer on the operator's PBX console to indicate activity on the particular trunk line. In attaching to jack position 25, lead 24 replaces lead 26 which conducts all signals to the operator's console light and buzzer 46. Having been temporarily disconnected from jack position 25, lead 26 is attached to jack 28 of the recall circuit 10. This installation effectively causes the recall circuit 10 to be interposed between the standard operator signal transmission circuit 50 and the operator's signal receiving equipment (the light and buzzer 46), both of which are components of the switchboard's original equipment. If the operator's console is originally equipped with a light only, it may be desirable to install a buzzer to provide both audible and visual recall signaling.

In the discussion of the operator recall circuit 10 which follows, those relay switches designated X in the figure are normally open switches which become closed upon the energizing of their respective relays. Conversely those relay switches designated "—" are normally closed switches which become open upon the energizing of their respective relays. For clarity, the components of the printed circuit 10 and their respective functions will be described in conjunction with the operation of the switchboard unit.

As an operational starting point, assume that the particular trunk circuit 11 to which the recall unit 10 is connected is idle. Capacitor C of the recall accessory is charged to the same potential difference as exists between leads 12 and 14 by virtue of its being coupled between such leads by lines 30 and 32. Relay A is not energized because no circuit is completed through lead 18, connecting relay **19*a* of the trunk circuit being in its normally open position. Relay B is also not energized because switch $A_2$ is in its normally open position and therefore no current flows through circuit 30, 34, 36, 38 to properly bias transistor switch 40 to its conducting mode. With relays A and B de-energized, the operator's console signal light and buzzer 46 are separated from the trunk circuit's unanswered call signal generator 48 by the normally open switch $A_3$, while the operator's signal light and buzzer 46 are exposed to the standard switchboard signal transmission circuit 50** by the normally closed switch $A_4$.

When a distant calling station seizes the trunk line by dialing in, ringing current operates the signal transmission circuit 50 in normal fashion to transmit a flashing signal through switch $A_4$ to the operator's console lights and buzzer 46, indicating an unanswered call on the trunk line. The normally closed switch $A_4$ simply permits the signal to be transmitted as though lead 26 were inserted directly into jack position 25. When the switchboard attendant operates the trunk answer key **17*a* in response to the flashing signal transmitted through circuit 50 and learns to whom the call is directed, the call may be extended by any of three possible alternatives: first, the operator may extend the call to an idle line, in which case the idle line will ring and the signal transmission circuit 50 will transmit a "ringing signal" from a different signal generator to the operator's console light; second, the line to which the operator extends the call may be busy in which case she may place the call on hold, thereby causing the circuit 50** to transmit a "hold signal"; or third, the operator may camp on the call to a busy extension, whereby the extension will be automatically rung when it becomes idle.

In none of the above three cases does the standard switchboard signal transmission circuit 50 send an unanswered call signal to the operator after the call has been extended, placed on hold, or camped on. Consequently the calling party may find his line unattended for an inordinate length of time if he has been unable to complete his call, forcing him to hang up and re-dial to obtain the operator's assistance. It is desirable therefore, if the called extension is not answered within a reasonable period of time or if the operator forgets that she has placed a call on hold, or if the called extension remains busy so that the camp on mechanism cannot ring the extension or, if rung, the extension does not answer, that the operator automatically receive another unanswered call signal after a predetermined time lapse. This function is accomplished by the recall circuit 10.

When the operator extends the call to an idle line, places the call on hold, or camps on the call to a busy extension, the connecting relay switch **19*a* of the trunk circuit 11 closes, thereby completing a circuit between leads 12 and 18 of the recall circuit 10 through transistor switch 52 which is thereby biased to its conducting mode. Completion of this circuit energizes relay A which in turn closes switches $A_2$ and $A_3$ and opens switches $A_1$ and $A_4$ simultaneously. The closure of switch $A_2$ completes the circuit 30, 34, 36, 38 which controls the bias of transistor switch 40. Capacitor C which, as previously mentioned, has been previously charged up to a potential equal to that existing between leads 12 and 14, now begins to discharge through the circuit completed by the closure of switch $A_2$, thereby temporarily causing a biasing current sufficient to place transistor 40 in its conducting mode. A circuit is thereby completed between leads 12 and 14 through relay B, energizing relay B for a predetermined period of time until the charge on capacitor C has decreased to the point where it can no longer maintain the conductive bias of transistor 40. This period of time is dependent upon the adjustment of the variable potentiometer $R_2$ which, together with a fixed resistance $R_1$, determines the RC time constant of the circuit 30, 34, 36, 38. Preferably the maximum resistance of $R_2$ is sufficiently greater than that of $R_1$ so that the time rate of discharge of capacitor C can be varied to retain transistor switch 40** in its conducting mode for a period of between approximately 10 and 60 seconds. It is this time lapse which determines the period of delay after which the operator will be recalled in the manner to be described.

The energizing of relay B is substantially simultaneous with the energizing of relay A and operates to open switch $B_1$, thereby temporarily separating the operator's console signal light and buzzer 46 from the unanswered call signal generator 48 of the trunk circuit 11 even though switch $A_3$ has been closed by the energizing of relay A. At the same time, relay B temporarily continues the connection between the light and buzzer 46 and the standard switchboard signal transmission circuit 50 by closure of switch $B_2$, despite the opening of switch $A_4$. Consequently, as long as relay B remains energized by the conduction of current through transistor switch 40, the operator's console light and buzzer remain coupled with the signal transmission circuit 50 of the switchboard. However as soon as capacitor C has discharged to the point where transistor 40 is no longer conductive (i.e. after a time lapse dependent upon the setting of $R_2$), the transmission of current through relay B is interrupted. The resultant de-energizing of relay B returns switch $B_1$ to its normally closed position and, in combination with switch $A_3$ which is closed by the continued energizing of relay A, completes a circuit between the unanswered call signal generator 48 and the console light and buzzer 46, thereby recalling the operator by a flashing light and audible tone. At this point the connection between the console light and buzzer 46 and signal transmission circuit 50 is simultaneously broken by the opening of switch $B_2$ and the continued opening of switch $A_4$.

When the operator switches into the trunk line by actuation of the trunk key 17*a* in response to the recall signal, regardless of whether or not the timing of the RC circuit 30, 34, 36, 38 has been completed, lead 16 becomes grounded thereby removing the conductive biasing of transistor switch 52 and de-energizing relay A. (In this connection it should be noted that the diode 54 prevents the short circuiting of lead 18 through lead 16 in the event both are exposed to ground.) Alternatively, if the called extension answers before the time delay period has expired, relay A is also de-energized by the normal opening of connecting relay 19*a* of the trunk circuit. In either case, upon the de-energizing of relay A the recall circuit 10 is reset and all switches are returned to their normal idle circuit conditions in preparation for the next instance when a trunk call is extended, placed on hold, or camped on, in which case the sequence just described repeats itself.

Although in the preferred embodiment of the invention described herein the recall circuit 10 is connected to the unanswered call signal generator 48 of the switchboard trunk circuitry 11, it should be noted that the recall circuit could alternatively be equipped with its own unanswered call signal generator which might comprise only a simple, intermittent "flashing" ground, and thereby obviate the need for the lead 20.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An automatic operator recall accessory for a PBX switchboard unit having a trunk line, an operator's console having signalling means for indicating activity on said trunk line and a standard circuit for selectively actuating said signalling means by transmitting different signals thereto in response to said activity on said trunk line, said accessory comprising time-delay switching means adapted to be interposed electrically between said standard circuit and said signalling means, said switching means including means for selectively permitting said signalling means to respond to said signals from said standard circuit during a predetermined time period and further including means for causing said signalling means to respond to a substituted signal from other than said standard circuit after said predetermined time period has expired.

2. The accessory of claim 1 wherein said switchboard unit includes an "unanswered call" signal generator and wherein said time-delay switching means includes means adapted to be connected to said unanswered call signal generator for transmitting signals therefrom to said signalling means after said predetermined time period has expired.

3. The accessory of claim 1 wherein said switchboard unit includes connecting circuitry operable in response to the extension of a call from said trunk line to another circuit of said switchboard, and wherein said accessory further includes means adapted for connection to said connecting circuitry for starting said predetermined time period in response to the operation of said connecting circuitry.

4. The accessory of claim 1 wherein said time-delay switching means includes a time-delay circuit comprising a capacitor and a resistor in series for establishing said predetermined time period dependent upon the time rate of discharge of said capacitor through said resistor.

5. The accessory of claim 4 wherein said resistor comprises an adjustably variable potentiometer for permitting adjustment of said predetermined time period.

6. An automatic operator recall accessory for a PBX switchboard unit having a trunk line circuit and an operator's console having signalling means for indicating activity on said trunk line, said accessory comprising a time-delay switching circuit having attaching means adapted for connecting said time-delay circuit to said switchboard unit's trunk line circuit and to said signalling means, means for automatically transmitting a recall signal to said signalling means a predetermined period of time after a call on said trunk line has been extended through said switchboard unit without such call having been completed, and means for starting said predetermined period of time in response to the extension of said call through said switchboard unit.

7. The accessory of claim 6 wherein said time-delay circuit includes means for adjustably varying said predetermined period of time.

8. The accessory of claim 6 wherein said time-delay circuit includes means responsive to said trunk line circuit for preventing the transmission of said recall signal if said call is completed before the expiration of said predetermined period of time.

9. The accessory of claim 6 wherein said PBX switchboard unit includes an unanswered call signal generator and further includes a standard circuit for selectively transmitting said unanswered call signal to said signalling means whenever an unanswered call is on said trunk line, said time-delay switching circuit including means for selectively transmitting said unanswered call signal to said signalling means independently of said standard circuit after said predetermined time period has expired.

10. A method of adding an automatic operator recall function to a PBX switchboard unit having a trunk line, trunk line connecting circuitry operable in response to extension of calls from said trunk line, an operator's console having signalling means for indicating activity on said trunk line and a standard circuit for selectively actuating said signalling means by transmitting different signals thereto in response to said activity on said trunk line, said method comprising:

a. interposing a selectively actuated time-delay switching circuit between said standard circuit and said signalling means so as to thereby selectively control the transmission of signals from said circuit to said signalling means; and b. connecting said time-delay circuit to said trunk line connecting circuitry so as to actuate said time-delay circuit in response to the extension of calls from said trunk line.

* * * * *